United States Patent Office 3,520,652
Patented July 14, 1970

3,520,652
AMMONIUM POLYPHOSPHATE PRODUCED AT ATMOSPHERIC PRESSURE
Thad D. Farr, Sheffield, and Henry K. Walters, Jr., Florence, Ala., assignors to Tennessee Valley Authority, a corporation
Original application Aug. 24, 1967, Ser. No. 663,171, now Patent No. 3,484,192, dated Dec. 16, 1969. Divided and this application Oct. 2, 1968, Ser. No. 765,743
Int. Cl. C01b 25/28, 25/38
U.S. Cl. 23—107         1 Claim

ABSTRACT OF THE DISCLOSURE

A process for the preparation of ammonium polyphosphate by the ammoniation of polyphosphoric acids containing more than 80 percent $P_2O_5$ with concurrent hydrolysis of the objectionable long-chain phosphate species. An intermediate aqueous slurry, pH 7.4 to 8.9, is prepared at 70° to 110° C. and processed further to produce granular solids, with good physical properties, that contain mostly ammonium ortho-, pyro-, and tripolyphosphate.

---

This is a division of application Ser. No. 663,171, filed Aug. 24, 1967, now U.S. Pat. 3,484,192.

Our invention relates to an improved process for the production of high-analysis ammonium polyphosphate salts and more particularly to the preparation of ammonium acyclic polyphosphate salts by the ammoniation of superphosphoric acid at atmospheric pressure.

The term "superphosphoric acid" used in the specification and claims is defined as a mixture of ortho-, pyro-, and higher condensed phosphoric acids with the general formula $H_{n+2}P_nO_{3n+1}$. The distribution of the acid species varies with the $P_2O_5$ content of the superphosphoric acid. The Canadian Journal of Chemistry, vol. 34 (1956), page 790, shows that superphosphoric acid in the range 69.81 to 84.95 percent $P_2O_5$ contains the following proportions of ortho-, pyro-, and higher condensed acyclic polyphosphoric acids, expressed as percent of total phosphorus.

97.85 to 2.32 percent ortho-
2.15 to 49.30 percent pyro-
0.00 to 24.98 percent tripoly-
0.00 to 16.99 percent tetrapoly-
0.00 to 12.64 percent pentapoly-
0.00 to 9.75 percent hexapoly-
0.00 to 8.63 percent heptapoly-
0.00 to 7.85 percent octapoly-
0.00 to 6.03 percent nonapoloy-
0.00 to 29.41 percent higher polymers.

Acids of the above type are available from commercial sources of electric-furnace superphosphoric acid plants and may be produced with $P_2O_5$ contents ranging from about 74 to about 83 percent by a process described in U.S. Pat. 3,015,540, Striplin.

Our invention is especially valuable in the production of solid ammonium polyphosphates by the atmospheric ammoniation of superphosphoric acid of any practical $P_2O_5$ content higher than about 80 percent. Either electric-furnace acid or concentrated wet-process acid can be used. If concentrated wet-process phosphoric acids are desired, they can be produced by concentrating ordinary merchant-grade wet-process phosphoric acid containing approximately 54 weight percent $P_2O_5$ and also containing incidental metallic impurities ranging from about 1 to 10 percent by a dehydration process to remove water from the merchant-grade wet-process phosphoric acid and increase its $P_2O_5$ content up into the wet acid super range of about 60 percent to about 80 percent $P_2O_5$ by a process such as that described in the copending application Ser. No. 835,377, Getsinger, assigned to the assignee of the present invention, and also described in U.S. Pat. 3,192,013. When using such wet-process phosphoric acid, the distribution of the acid species therein has been observed to be somewhat different from that which would result if highly concentrated substantially pure furnace acid were used.

Heretofore a method for the production of ammonium polyphosphate has been described in U.S. Pats. 3,171,733 and 3,228,752, Hignett et al. In this prior process, superphosphoric acid, either wet-process or electric-furnace type, is treated with gaseous ammonia in a reactor under a pressure of about 25 to about 1000 p.s.i.g. and a temperature of 365° to 450° F., the molten material is discharged from the reactor and is granulated by mixing with recycle fines in a pugmill, and the granules are cooled and then screened to separate particles of the desired size for product. The products had compositions ranging from 12.9 to 18.3 percent N and 59.2 to 64.2 percent $P_2O_5$, which corresponds to a degree of ammoniation ranging from 4.9 to 7.5 pounds $NH_3$ per unit (20 pounds) $P_2O_5$. The product is composed of two major phases, monoammonium orthophosphate and triammonium pyrophosphate, and a minor phase diammonium pyrophosphate; the phosphate is divided about equally between ortho and non-ortho forms. Some of the products from this pressure process, however, have had some outstanding disadvantages. It has a relatively low degree of ammoniation as compared to 9.6 pounds $NH_3$ per unit $P_2O_5$ in diammonium orthophosphate or in tetraammonium pyrophosphate. Another disadvantage is that it will cake in storage unless conditioned; the caking characteristics have been attributed to the instability of one of its major phases.

Another method for preparing solid ammonium phosphates of unspecified distribution of phosphate species by ammoniating concentrated wet-process orthophosphoric acid ($P_2O_5$ content between 68.6 and 80 percent) at 70° C. to 225° C. to provide at least 0.14 part N per part P is described in U.S. Pats. 3,241,946 and 3,243,279, D. C. Young. Young states: "The exact nature of the ammonium phosphate products is not known with certainty. It is believed, however, that the major proportion of the product is a mixture of ammonium orthophosphates and ammonium polyphosphates with the presence of some P—N bonds, e.g., phosphoamido and phosphoimido compounds." Young does not specify how acid concentration, temperature, pH, and water content affect the distribution of phosphate species in such products, whereas, in the present application we do specify and give examples of the effects of acid concentration, temperature, pH, and water content on the distribution of phosphate species in the solid products obtained. Furthermore, Young does not teach, as we do, how these process variables may be controlled to obtain solid products with a high degree of ammoniation and with a desirable combination of orthophosphate and condensed phosphates.

It is therefore an object of the present invention to provide a process wherein superphosphoric acid containing more than about 80 percent $P_2O_5$ is ammoniated and hydrolyzed under specified conditions to prepare an intermediate slurry at pH about 8 that is granulated with recycle and dried to produce final granular products which contain all the $P_2O_5$ that was in the starting acid, which have relatively high ratios of N to $P_2O_5$, which consist mostly of ammonium ortho-, pyro-, and tripolyphosphates, and which have good handling and storage properties.

Another object of the present invention is to provide a process whereby impure superphosphoric acids such as concentrated wet-process phosphoric acids are ammoniated at atmospheric pressure to produce high-analysis products that may preferably be used as a fertilizer.

Still another object of the present invention is to provide such processes in which the ammoniation of superphosphoric acids is carried out economically at atmospheric pressure with conventional equipment.

Still further and more general objects and advantages of the present invention will appear from the more detailed description set forth, it being understood, however, that this more detailed description is given by way of illustration and explanation only and not by way of limitation, since various changes therein may be made by those skilled in the art without departing from the spirit and scope of the present invention.

In carrying out the objects of our invention in but several preferred forms thereof, we provide for the ammoniation of superphosphoric acids at atmospheric pressure to proceed in one or more stages and the resulting intermediate slurries are subsequently granulated to produce granules of ammonium polyphosphates which contain all the $P_2O_5$ that was originally present in the starting acid. The number of processing steps depends on the kind and composition of the superphoshoric acid that is used, and by the product that is desired, as will be disclosed in the subsequent detailed description.

Our invention, together with further objects and advantages thereof will be better understood from a consideration of the following descriptions taken in connection with the accompanying drawings in which.

In this modification of our process for the preparation of ammonium polyphosphate, which is designated as the controlled hydrolysis modification and is a division of copending application Ser. No. 663,171, the acids are ammoniated and hydrolyzed to prepare intermediate aqueous slurries with pH's ranging from about 7.4 to 8.9 that are processed further to produce granular solids. In developing this modification of our process to produce ammonium polyphosphates comprising ammonium ortho-, pyro-, and tripolyphosphate as the major phases, we discovered (a) that the temperature and pH at which the concentrated acid was ammoniated were critical in controlling the desired hydrolysis reactions, and (b) that to prepare intermediate slurries at high pH suitable for granulation it was necessary to use ammoniated acid solutions in which no more than about 15 percent of the phosphate was in forms more highly condensed than tripolyphosphate. Although the quantity of water used may vary widely, we discovered that the ammoniation reactions are benefited, and that the viscosities and the ratio of solid to solution in the slurries produced are optimal when the total water added ranges from about 0.8 to 1.4 pounds per pound of $P_2O_5$ in the starting acid.

By selecting a set of operating conditions of pH, temperature, and retention time for ammoniating a specific acid, all the phosphate species more highly condensed than tripolyphosphate may be hydrolyzed, although we prefer to operate under conditions that hyrolyze in the range of about 50 to 75 percent of these long-chain phosphates. In carrying out this hydrolysis procedure, the ammoniation-hydrolysis reactions may be done continuously or batch wise, or as a combination of both.

Figure 2:
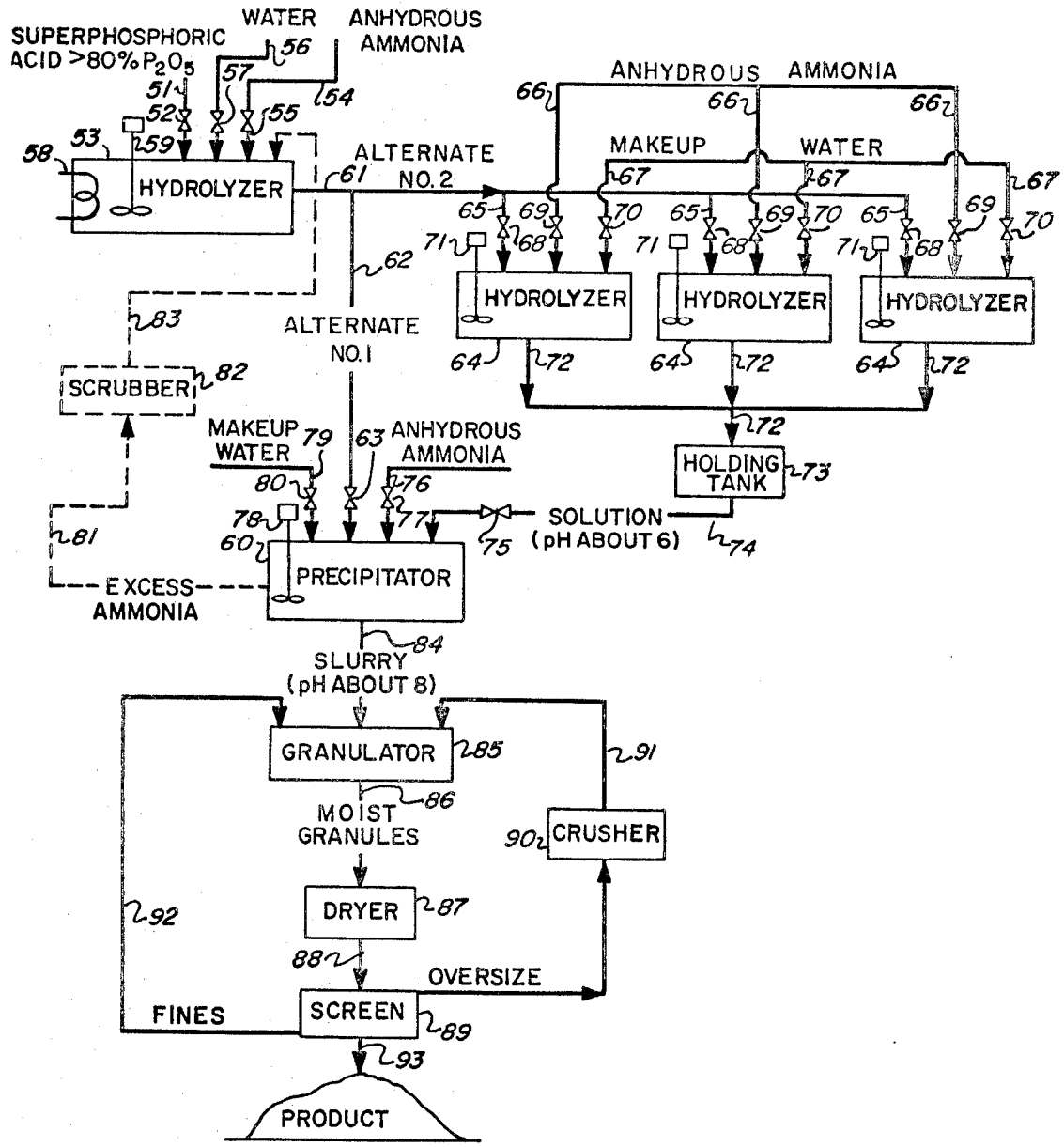
FIG. 2 is a flowsheet generally illustrating the principles of two alternate procedures of our controlled hydrolysis process, which results ultimately in the production of the desired high-analysis granular ammonium polyphosphates by the atmospheric-pressure ammoniation of superphosphoric acid preferably containing more than about 80 percent $P_2O_5$.

Referring now more specifically, to FIG. 2, superphosphoric acid from a source not shown is fed through line 51 and any suitable means 52 for controlling the rate of flow into hydrolyzer 53. Anhydrous ammonia from a source not shown is fed into hydrolyzer 53 through line 54 and means 55 for controlling the rate of flow. Water from a source not shown is fed into hydrolyzer 53 through line 56 and means 57 for controlling the rate of flow. Hydrolyzer 53 is equipped with a pH meter not shown, cooling coils 58 to control the temperature of the solution in the range from about 70° to about 110° C., and a motor-driven agitator 59 running at such speed as to obtain rapid and intimate mixing of the acid, water, and ammonia. The three reactants are added simultaneously and at such rates as to maintain a solution with a selected pH in the range of about 0.1 to about 4 and a gross composition of more than about 33 weight percent total $(N+P_2O_5)$, preferably more than about 50 weight percent total $(N+P_2O_5)$ and in which the species more condensed than tripolyphosphate has been reduced to within the range of about 1 to about 30 percent. We prefer to add the acid and water to hydrolyzer 53 at fixed rates according to the capacity of the equipment and to vary the rate of addition of anhydrous ammonia as may be necessary to maintain the desired pH of the resultant solution. The average retention time in hydrolyzer 53 normally will be in excess of about 5 minutes.

When the solution from hydrolyzer 53 contains no more about 15 percent of its phosphate in species more condensed than tripolyphosphate, the solution from hydrolyzer 53 is transferred directly to precipitator 60 by alternate No. 1 through lines 61 and 62 and means 63 for controlling the rate of flow, as specified in copending application Ser. No. 765,744. When the solution from hydrolyzer 53 contains between about 15 and about 30 percent of its phosphate in species more condensed than tripolyphosphate, the solution from hydrolyzer 53 is transferred by alternate No. 2 to a group of batch hydrolyzers 64 where it is mixed with anhydrous ammonia and makeup water as indicated in the diagram via lines 65, 66, and 67, and means 68, 69, and 70 for controlling the quantities. The batch hydrolyzers 64 are equipped with pH meters not shown, and motor-driven agitators 71 running at such speed as to obtain rapid and intimate mixing of the solution from hydrolyzer 53, the ammonia, and the water. The three reactants are admitted to the batch hydrolyzers 64 in such proportions as to increase the pH from the range of about 0.1 to about 4 up to about 6. The batch hydrolyzers have a combined capacity sufficient to handle the solution produced continuuously in hydrolyzer 53. This second alternate ammoniation step is done without cooling and the temperature of the solution may range from about 70° C. to about 110° C. with an average retention time in the hydrolyzer in excess of about 5 minutes. The solution from the batch hydrolyzers 64 passes to precipitator 60 via line 72, holding tank 73, line 74, and any suitable means 75 for controlling the rate of flow.

The solution from the batch hydrolyzers 64, which contains no more than about 15 percent of its phosphate in species more highly condensed than tripolyphosphate, is fed to precipitator 60, where it is reacted with anhydrous ammonia from a source not shown that is fed into vessel 60 through line 76 and means 77 for controlling the rate of flow. Precipitator 60 is equipped with a pH meter not shown and a motor-driven agitator 78 running at such speed as to obtain rapid and intimate mixing of the anhydrous ammonia and the solution from the continuous hydrolyzer 53 or from the batch hydrolyzers 64, which are added simultaneously and at such rates as to maintain a slurry of ammonium phosphates at a selected pH in the range of about 7.4 to about 8.9 with slurry compositions of more than about 45 weight percent total $(N+P_2O_5)$, or preferably ranging from about 13 to about 16 percent N and about 35 to about 42 percent $P_2O_5$. The average retention time in precipitator 60 normally will be in excess of about 5 minutes. The precipitation reaction in vessel 60 preferably is done without cooling and the temperature of the slurry may range from about 50° to about 110° C. To adjust the viscosity and composition of the slurry, water may be added to vessel 60 via line 79 and means 80 for controlling the rate of flow. In the precipitator the water content will range from about 20 to about 47 percent. The unreacted ammonia from precipitator 60 is recycled to hydrolyzer 53 via line 81, scrubber 82, and line 83.

The slurry from precipitator 60 is discharged through line 84 to granulator 85 where it is mixed with recycle fines. The granules, normally containing about 1 to 8 percent free water, are fed through line 86 into a dryer 87 operating in the temperature range of about 50° to about 110° C. The dry granules from 87 travel via line 88 to a screening means generally illustrated as screens 89 and crusher 90. The crushed oversize material and the fine material are returned to granulator 85 via lines 91 and 92, respectively. The granulator product, discharged through line 93 to storage, will contain about 17 to about 21 percent N and about 52 to about 60 percent $P_2O_5$ and will consist mostly of ammonium ortho-, pyro-, and tripolyphosphates; the ratio of N to $P_2O_5$ and the distribution of phosphate species in the product will depend upon the composition of the acid and the processing conditions used.

In order that those skilled in the art may better understand how the present invention can be practiced, the following examples of specification applications are given by way of illustration but not by way of limitation. This modification of our process, illustrated in FIG. 2, was developed from a series of tests to determine the effects of pH, temperature, and reaction time on the hydrolysis of the condensed phosphate species in superphosphoric acid containing more than about 80 percent $P_2O_5$. The object of the tests was to prepare at high pH intermediate slurries suitable for granulation that contained N and $P_2O_5$ in amounts corresponding to degrees of ammoniation in excess of 7 pounds $NH_3$ per unit (20 lbs.) of $P_2O_5$, and that contained mostly ortho-, pyro-, and tripolyphosphates.

In one test, the concentrated acid (83.4 percent $P_2O_5$), water, and ammonia were combined under the conditions (70° C. and pH 5.8) that are used commercially to produce 11-37-0 solution from less concentrated acid (about 78 percent $P_2O_5$). This solution then was treated with anhydrous ammonia to pH 9.6; no precipitation occurred, in contrast to tests in which the intermediate solution (11-37-0) prepared from less concentrated acids (<80 percent $P_2O_5$) were used, as illustrated in copending application, Ser. No. 663,171.

Figure 1:
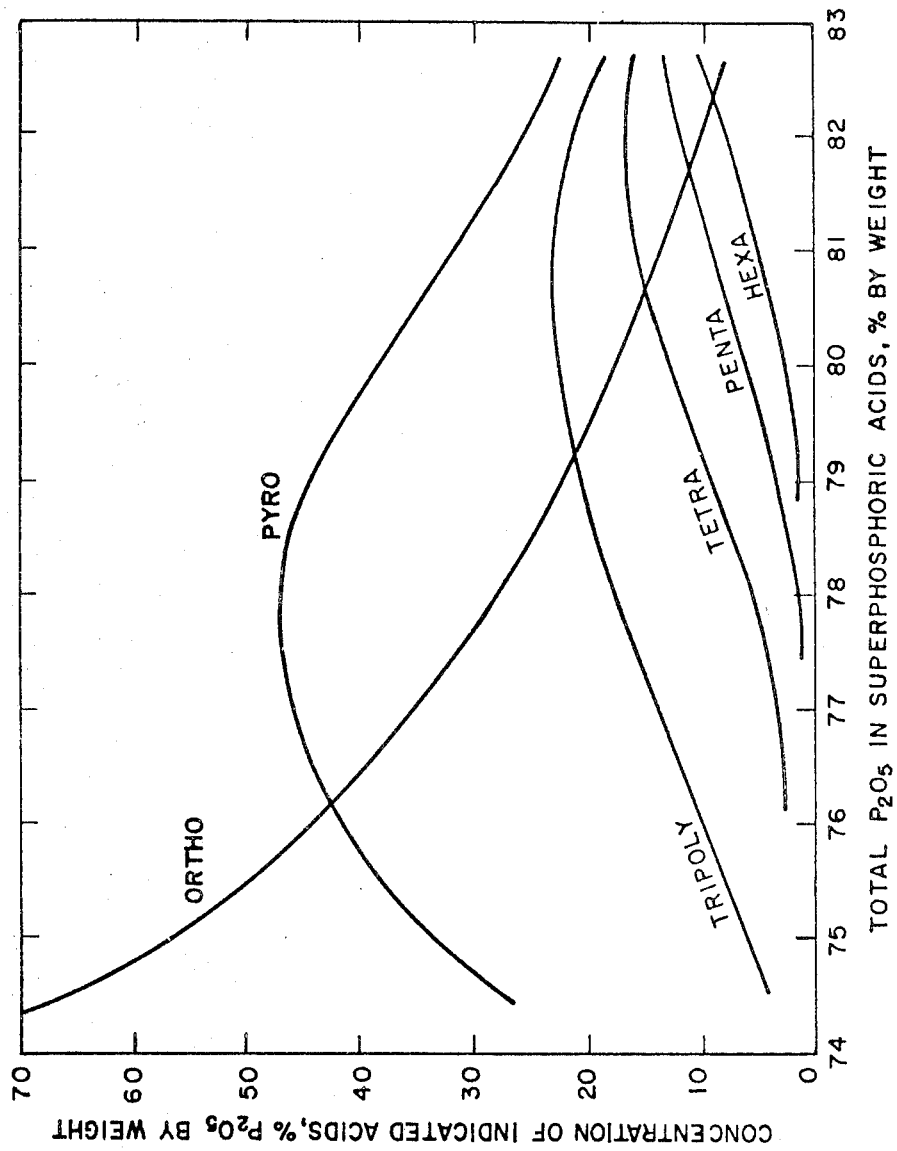
FIG. 1 is a graphical illustration showing the distribution of the principal acid species in commercially available electric-furnace superphosphoric acids which were used in the development of our process.

In another test, the same conditions were used except that the initial ammoniation was carried out at pH 4. The final ammoniation was stopped at pH 9.6 as before. The product was a milky liquid that became a white viscous gel on standing a few days. About two-thirds of the phosphorus in the concentrated acid (83.4 percent $P_2O_5$) that was used in these tests is more highly condensed than tripolyphosphate, as indicated in FIG. 1. In these tests, the long-chain phosphate species were not hydrolyzed rapidly enough to form sufficient amounts of ortho-, pyro-, and tripolyphospahtes for precipitation.

Electric furnace superphosphoric acid (83.4 percent $P_2O_5$) at 70° C., water, and anhydrous ammonia were combined continuously at pH about 0.2 to form a solution that contained 6.0 percent N and 48.4 percent $P_2O_5$. In this first ammoniation step, the temperature of the solution was maintained at about 70° C. by means of cooling coils. In the second step, ammonia was added batchwise to the solution to pH 5.9, and water was added at the start and at the end to adjust the $P_2O_5$ content to about 42 percent. The second ammoniation step was done without refrigeration, and the temperature of the solution was about 90° C. In the third step, the solution at pH 5.9 was treated with ammonia in a batch operation to pH 8.6. The third ammoniation step was done without refrigeration, and the temperature of the slurry was about 70° C.; water was added to replace that evaporated. The slurry was centrifuged, the solution phase was decanted, and the moist solids were dried at 66° C. The dry solids were crushed to pass a 12-mesh screen, and the fines were mixed with the reserved solution phase in the ratio of 3 parts fines to 1 part solution. The moist granules (about 8 percent $H_2O$) then were dried at 66° C. The granular product (0.6 percent free $H_2O$) had good physical properties, and contained 18.2 percent N and 58.4 percent $P_2O_5$ with the $P_2O_5$ distributed about equally among the ortho-, pyro-, and tripolyphosphate species. The results are summarized in the table below.

AMMONIATION OF SUPERPHOSPHORIC ACID (115 PERCENT $H_3PO_4$)

|  | Starting acid | Ammoniation | | | Granulation |
| --- | --- | --- | --- | --- | --- |
|  |  | Stage 1 | Stage 2 | Stage 3 |  |
| Operation |  | Contin. | Batch | Batch | Batch |
| Product |  | Soln. | Soln. | Slurry | Granules |
| pH: |  |  |  |  |  |
| Initial |  | 0.2 | 0.2 | 5.9 |  |
| Final |  | 0.2 | 5.9 | 8.6 |  |
| Temp., °C.: |  |  |  |  |  |
| Initial |  |  | 70 | 38 | 58 |
| Max |  | 70 | 72 | 92 | 72 | 66 |
| Final |  |  | 71 | 92 | 53 |  |
| Time, min |  |  | 37 | 36 | 43 |  |
| Product: |  |  |  |  |  |
| Compn., percent: |  |  |  |  |  |
| N |  |  | 6.0 | 12 | 14.6 | 18.2 |
| $P_2O_5$ |  | 83.4 | 48.4 | 42 | 39.7 | 58.4 |
| Lb. $NH_3$/unit $P_2O_5$ |  |  | 3.0 | 7.0 | 8.9 | 7.6 |
| Distribution, percent, of $P_2O_5$: |  |  |  |  |  |
| Ortho |  | 5 | 24 | 35 | 34 | 37 |
| Pyro |  | 15 | 28 | 31 | 29 | 32 |
| Tri |  | 15 | 18 | 19 | 22 | 29 |
| Tetra |  | 14 | 15 | 8 | 10 |  |
| Penta |  | 12 | 7 | 4 | 3 |  |
| Other |  | 39 | 8 | 3 | 2 | 2 |

The fraction of the phosphorus present in forms more condensed than tripolyphosphate decreased from about 65 to 15 percent during the first two stages of ammoniation, but there was no further hydrolysis in the third stage. Further, hydrolysis occurred, however, during granulation. The phosphorus present as tetrapolyphosphate and longer-chain species decreased from 15 percent in the slurry to 2 percent in the dry granular product.

What we claim as new and desire to secure by Letters Patent of the United States is:

1. An improved fully integrated process for the production of ammonium polyphosphates which comprises the steps of:

at atmospheric pressure:

(1) simultaneously introducing a stream of superphosphoric acid and streams of anhydrous ammonia and water into a first reaction zone, said superphosphoric acid containing more than about 80 percent $P_2O_5$ by weight; therein rapidly and intimately mixing said streams; controlling the proportions of said superphosphoric acid, anhydrous ammonia and water such that the reactants have a retention time in said first reaction zone in excess of about 5 minutes and that the resulting reaction product formed in the temperature range of about 70 to about 110° C. has a pH in the range of about 0.1 to about 4 and contains more than about 33 weight percent total $(N+P_2O_5)$, in which the phosphate species more condensed than tripolyphosphate is reduced to a maximum of about 30 percent of the total phosphate;

(2) withdrawing from said first reaction zone a stream of the reaction product and introducing said withdrawn reaction product into a second reaction zone comprising one to three batch reactors having a combined capacity sufficient to handle the solution produced continuously in said first reaction zone, adding thereto anhydrous ammonia sufficient to increase the pH of the solution from the said first reaction zone from within the range of about 0.1 to about 4 up to a pH of about 6; maintaining the temperature of the solution in the batch reactors in the range from about 70° to about 110° C.; adding thereto water sufficient to maintain a water content in the range of about 20 to about 47 percent by weight; withdrawing a stream of the reaction product from the said alternate batch reactors containing a maximum of about 15 percent of the phosphate as species more condensed than tripolyphosphate;

(3) introducing said withdrawn product into a third reaction zone, wherein the said withdrawn reaction product, together with a stream of anhydrous ammonia and a stream of makeup water are added to adjust the viscosity and to maintain the water content of the mixture in said third reaction zone in the range of about 20 to about 47 percent by weight; maintaining the temperature in said third reaction zone in the range from about 50° to 110° C.; controlling the relative proportions of anhydrous ammonia and reaction product added to said third reaction zone to maintain a pH therein within the range from about 7.4 to 8.9, said pH adjustment sufficient to form in said third reaction zone a slurry which has a gross composition of more than about 45 weight percent total $(N+P_2O_5)$, said gross composition comprising about 13 to about 16 percent N and about 35 to about 42 percent $P_2O_5$; retaining said slurry in said third reaction zone for a period in excess of about 5 minutes;

(4) withdrawing a stream of said slurry from said third reaction zone and subjecting said withdrawn stream of slurry to granulation and drying (temperature ranging from about 50° to about 110° C.) operations and recovering therefrom a solid product which comprises substantially ammonium ortho-, pyro-, and tripolyphosphates, and which contains by weight from about 17 to about 21 percent nitrogen and from about 52 to about 60 percent $P_2O_5$.

References Cited

UNITED STATES PATENTS

| | | | |
|---|---|---|---|
| 2,913,329 | 11/1959 | Geiersberger et al. | 71—37 |
| 3,243,279 | 3/1966 | Young | 71—43 |
| 3,382,059 | 5/1968 | Getsinger | 71—34 |

OTHER REFERENCES

New Developments in Fertilizer Technology, TVA 1966, pp. 52–55.

OSCAR R. VERTIZ, Primary Examiner

G. A. HELLER, Assistant Examiner

U.S. Cl. X.R.

71—34, 43